May 9, 1961 A. T. KNEALE 2,983,830

HIGH IMPEDANCE TRANSISTOR PICK-OFF CIRCUIT

Filed April 11, 1956

INVENTOR.
ALLAN T. KNEALE
BY Henry L. Shenier
ATTORNEY

United States Patent Office 2,983,830

Patented May 9, 1961

2,983,830

HIGH IMPEDANCE TRANSISTOR PICK-OFF CIRCUIT

Allan T. Kneale, Armonk, N.Y., assignor, by mesne assignments, to United Aircraft Corporation, East Hartford, Conn., a corporation of Delaware Filed Apr. 11, 1956, Ser. No. 577,587

1 Claim. (Cl. 307—885)

My invention relates to a high impedance transistor pick-off circuit and more particularly to a high impedance transistor pick-off circuit which operates on a positive-going saw-tooth voltage.

Pick-off circuits are known in the prior art for comparing a reference or pick-off potential with a negative-going saw-tooth voltage. In these circuits of the prior art an electron tube is biased to be normally conducting. When a negative-going saw-tooth voltage reaches the circuit reference potential, a signal is applied to the tube control grid to extinguish conduction through the tube. It is desirable in some instances that a positive-going saw-tooth voltage be compared with a reference potential. It will be clear that the same circuit which is responsive to negative-going saw-tooth voltages will not operate for positive-going saw-tooth voltages.

I have invented a high impedance transistor pick-off circuit which accurately determines the time at which a positive-going saw-tooth voltage equals a reference potential. My circuit has a very high input impedance. Consequently, a very small current is drawn from the input voltage source. As a result of the small load or current there will be substantially no distortion of the input voltage wave form.

One object of my invention is to provide a high impedance transistor pick-off circuit for accurately determining the time at which a positive-going saw-tooth voltage equals a reference voltage.

Another object of my invention is to provide a pick-off circuit having a very high input impedance.

A further object of my invention is to provide a high impedance transistor pick-off circuit which operates on positive-going saw-tooth voltages.

Still another object of my invention is to provide a high impedance transistor pick-off circuit for producing a substantially square or rectangular wave form having a sharp leading edge.

Other and further objects of my invention will appear from the following description.

In general my invention contemplates the provision of a high impedance transistor pick-off circuit including a normally conducting transistor having a base, an emitter, and a collector. My circuit includes a unidirectional conducting device such as a crystal or diode for applying a positive-going saw-tooth voltage to the transistor base. A reference or pick-off potential normally renders the unidirectional device nonconducting. When the input saw-tooth voltage reaches the level of the reference potential, it overcomes this potential and the unidirectional device conducts. As a consequence of conduction through this device, the potential of the transistor base is raised to extinguish conduction in the emitter and collector circuits. A pulse transformer coupling the transistor emitter circuit and the crystal or diode circuit provides regenerative feedback which renders the cessation of conduction substantially instantaneous. At the trailing edge of the saw-tooth input wave form the transistor again conducts. A negative-going substantially square or rectangular wave form, the leading edge of which is extremely sharp, is available at the transistor collector and sharp pulses appear at the emitter.

In the accompanying drawings which form part of the instant specification and which are to be read in conjunction therewith and in which like reference numerals are used to indicate like parts in the various views.

Figure 1:
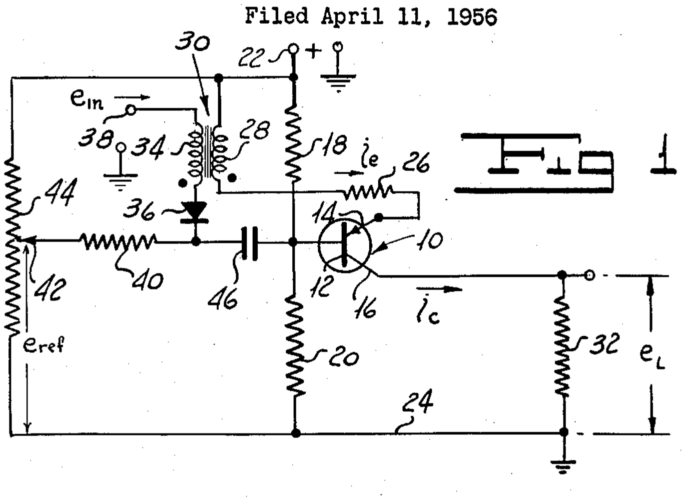
Figure 1 is a schematic view of my high impedance transistor pick-off circuit.

More particularly referring now to Figure 1 of the drawings, my high impedance pick-off circuit includes a transistor, indicated generally by the reference character 10, having a base 12, an emitter 14, and a collector 16. As will be understood by those skilled in the art, the transistor 10 is of the p-n-p type. A voltage divider including resistors 18 and 20, connected in series between the positive terminal 22 of a source of electrical potential and a grounded conductor 24, provides a bias for the transistor base 12, which base is connected to the junction of resistors 18 and 20. I connect a resistor 26 in series with the primary winding 28 of a pulse transformer, indicated generally by the reference character 30, between positive terminal 22 and the emitter 14. I connect a load resistor 32 between the collector 16 and ground conductor 24.

I so bias my transistor that a current $i_e$ flows from the emitter toward the base 12 and a current $i_c$ flows in the collector circuit. Owing to the flow of current $i_c$ in the collector circuit, a potential $e_L$ appears across load resistor 32. This is the quiescent condition of my high impedance pick-off circuit.

I connect the secondary winding 34 of transformer 30 in series with a unidirectional conducting device such as a diode or crystal 36 between the circuit input terminal 38 and a resistor 40. I connect resistor 40 to the adjustable brush 42 of a voltage dividing resistor 44. I connect resistor 44 across terminal 22 and ground conductor 24. The potential at brush 42 is the reference or pick-off potential of my circuit. When there is no signal potential applied to input terminal 38, the voltage at brush 42 renders crystal 36 nonconductive. My circuit includes a coupling capacitor 46 for applying the potential at the junction of crystal 36 and resistor 40 to the base 12 of transistor 10.

Figure 2:
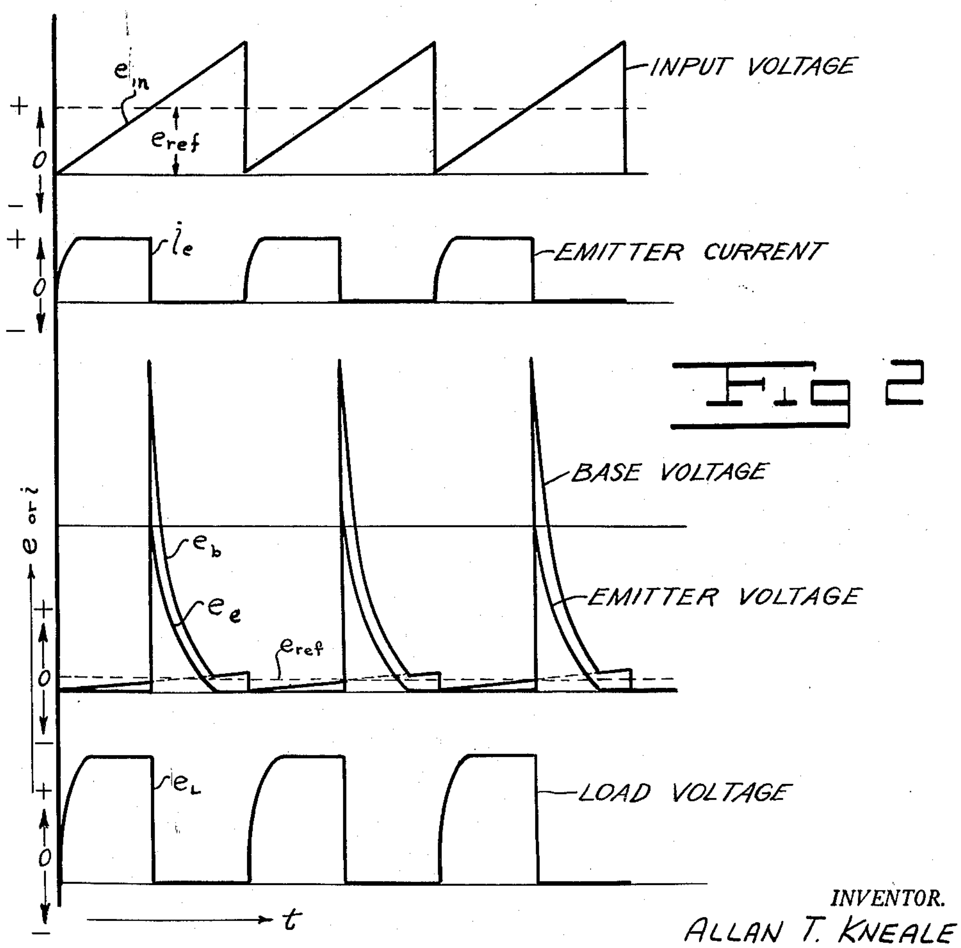
Figure 2 is a diagrammatic view showing the wave forms appearing at various points in the circuit shown in Figure 1.

As can be seen in reference to Figure 2, I apply a repetitive positive-going voltage having a saw-tooth wave form $e_{in}$ to the input terminal 38 of my circuit. When this wave form reaches the potential level $e_{ref}$ of brush 42, crystal 36 begins to conduct. Owing to this conduction a current flows through resistor 40 to raise the potential of the junction between crystal 36 and resistor 40. Capacitor 46 applies this potential increase to the base 12 of transistor 10. As the potential of base 12 rises, the current $i_e$ in the emitter circuit drops. Owing to the drop in current through winding 28, the winding develops a counterelectromotive force in a direction to resist this change. The direction of this counter-electromotive force or potential is such that the terminal of the winding 28 connected to resistor 26 becomes positive. I so wind the secondary winding 34 of transformer 30 that a potential of the same polarity appears in this winding. In other words, the secondary potential polarity is such that the terminal of winding 34 connected to crystal 36 is positive. I wind transformer 30 with a step-up ratio between windings 28 and 34. As a result, the terminal of winding 34 connected to crystal 36 rises to a higher potential than does the terminal of winding 28 connected to resistor 26. The potential induced in winding 34, together with the increasing input voltage, augments the current flow through resistor 40 and the potential of base 12 increases further to reduce the current $i_e$. It is to be understood that this regenerative action is cumulative and extremely rapid, with the result that the current $i_e$ in the emitter circuit is interrupted substantially instantaneously. This extremely rapid extinction of current in the emitter circuit results in a spike or very sharp pulse, $e_e$, of voltage at the emitter. A spike or pulse, $e_b$, of greater magnitude appears at base 12. Owing to the nature of operation of transistor 10, when the current $i_e$ is extinguished rapidly, the collector current $i_c$ is likewise interrupted. Since the current flow through load resistor 32 falls rapidly to zero, the load voltage $e_L$ drops sharply to zero.

The energy represented by the large voltage pulse in the secondary winding 34 is dissipated through what is essentially a resistance-inductance circuit. As a result, this potential, which tends to sustain conduction through crystal 36, falls exponentially to zero. I have so selected the time constant of this circuit that the potential across secondary winding 34, owing to the regenerative feedback action, falls to zero before the input saw-tooth wave voltage drops to zero. As a result, the wave form of the potential applied to base 12 is modified by the input wave potential. It falls substantially exponentially until it reaches the level of the saw-tooth input wave potential, after which it follows this wave voltage. Since the potential level of the input voltage at this time remains above the level of the reference potential, the diode 36 remains conducting and the transistor 10 will not again conduct until the input wave voltage drops to zero. It is to be understood that the voltage pulse appearing at the emitter drops exponentially to zero. When the input wave potential falls to zero, conduction through crystal 36 is interrupted and the transistor 10 again conducts. Since at this time conduction through secondary winding 34 of transformer 30 is interrupted owing to the fact that diode 36 cannot conduct, there is no regenerative action as the currents $i_e$ and $i_c$ in the emitter and collector circuits build up. In other words, the rise time of the output voltage $e_L$ during the building up of current in the transistor circuits will be longer than the fall time of the output voltage during interruption of transistor collector current.

It will be seen that as a result of the operation of my circuit, a series of sharp pulses appear at emitter 14. At the same time the voltage $e_L$ across load resistor 32 has a negative-going substantially square or rectangular form, the fall time of which is extremely short.

It will be seen that I have accomplished the objects of my invention. I have provided a high impedance transistor pick-off circuit which accurately determines the time at which a positive-going saw-tooth input wave form reaches the level of a reference potential. Substantially no load is applied to the input wave form of my circuit. My circuit is responsive to positive-going saw-tooth waves. It produces a negative-going substantially square or rectangular wave form having a sharp leading edge at the collector. It also produces a series of sharp pulses at the transistor emitter.

It will be understood that certain features and subcombinations are of utility and may be employed without reference to other features and subcombinations. This is contemplated by and is within the scope of my claim. It is further obvious that various changes may be made in details within the scope of my claim without departing from the spirit of my invention. It is therefore to be understood that my invention is not to be limited to the specific details shown and described.

Having thus described my invention, what I claim is:

A high impedance pick-off circuit for determining when a variable direct-current input voltage becomes more positive than a predetermined reference voltage including in combination a source of variable direct-current input voltage, a source of predetermined reference voltage, a regenerative feedback transformer having a first and a second winding, a diode, means connecting the first winding and the diode in a series circuit having an input terminal and an output terminal, the diode being polarized to permit a flow of direct current in the series circuit only from the input terminal towards the output terminal, means connecting the source of reference voltage to the output terminal, a normally conducting p-n-p transistor having an n-type base and having p-type emitter and collector terminals, means connecting the output terminal of the series circuit to the base, means connecting the second winding to one of the p-type transistor terminals, and passive means responsive to direct-current for connecting the source of variable direct-current input voltage to the input terminal.

References Cited in the file of this patent

UNITED STATES PATENTS

| | | |
|---|---|---|
| 2,569,345 | Shea | Sept. 25, 1951 |
| 2,641,717 | Toth | June 9, 1953 |
| 2,683,806 | Moody | July 13, 1954 |
| 2,773,982 | Trousdale | Dec. 11, 1956 |
| 2,779,870 | Henry et al. | Jan. 29, 1957 |
| 2,820,153 | Woll | Jan. 14, 1958 |
| 2,846,580 | Light | Aug. 5, 1958 |
| 2,872,596 | Day et al. | Feb. 3, 1959 |

FOREIGN PATENTS

| | | |
|---|---|---|
| 737,249 | Great Britain | Sept. 21, 1955 |
| 1,086,254 | France | Aug. 11, 1954 |